Figure 1:
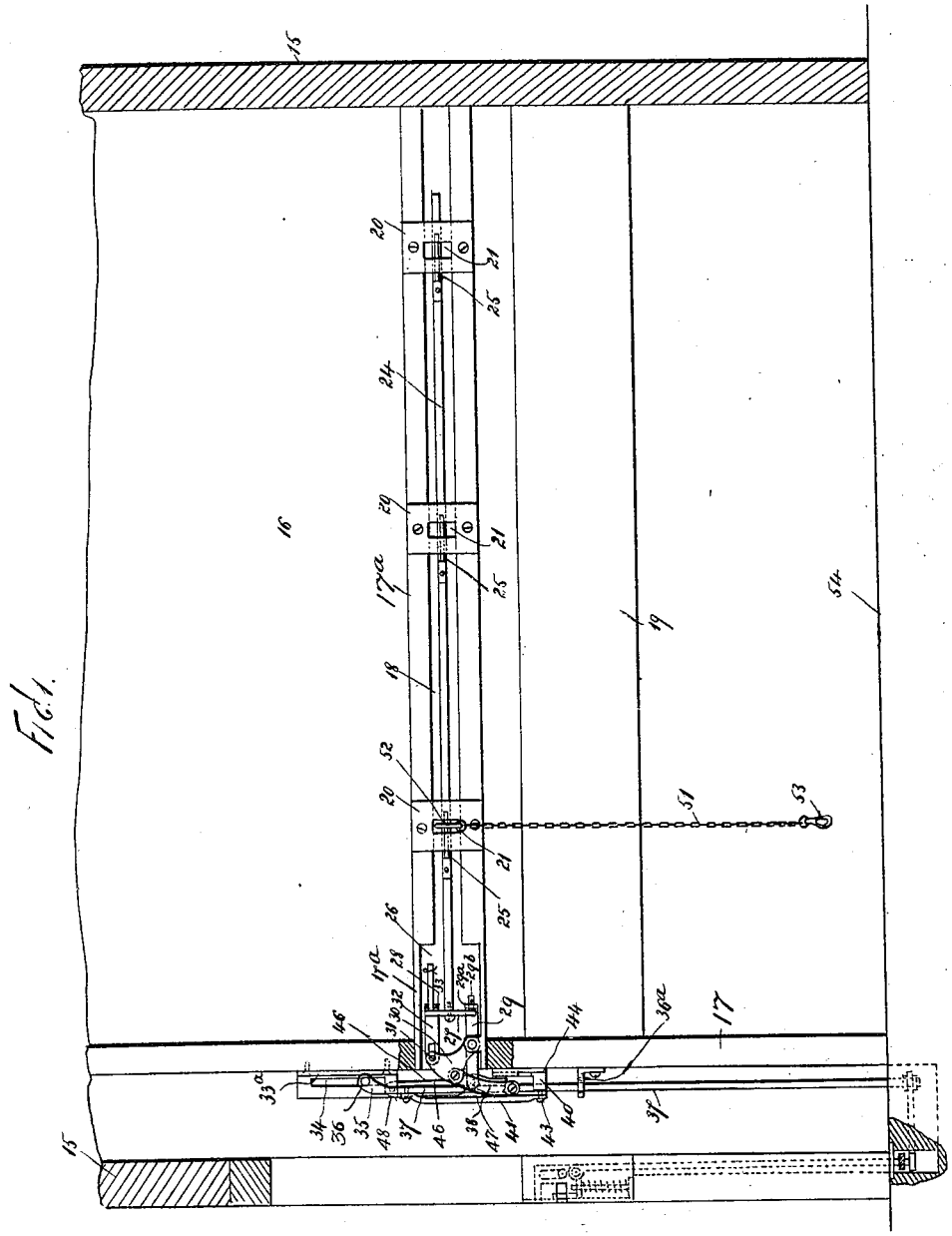

No. 670,280. Patented Mar. 19, 1901.
O. JOHNSON.
STABLE APPARATUS.
(Application filed Dec. 7, 1899.)
(No Model.) 3 Sheets—Sheet 1.

WITNESSES
INVENTOR
Olof Johnson,
BY
Edgar Tate & Co.
ATTORNEYS.

No. 670,280. Patented Mar. 19, 1901.
O. JOHNSON.
STABLE APPARATUS.
(Application filed Dec. 7, 1899.)
(No Model.) 3 Sheets—Sheet 2.

WITNESSES
John Buckler,
F. W. Stewart.

INVENTOR
Olof Johnson,
BY
Edgar Tate & Co.
ATTORNEYS

No. 670,280. Patented Mar. 19, 1901.
O. JOHNSON.
STABLE APPARATUS.
(Application filed Dec. 7, 1899.)
(No Model.) 3 Sheets—Sheet 3.
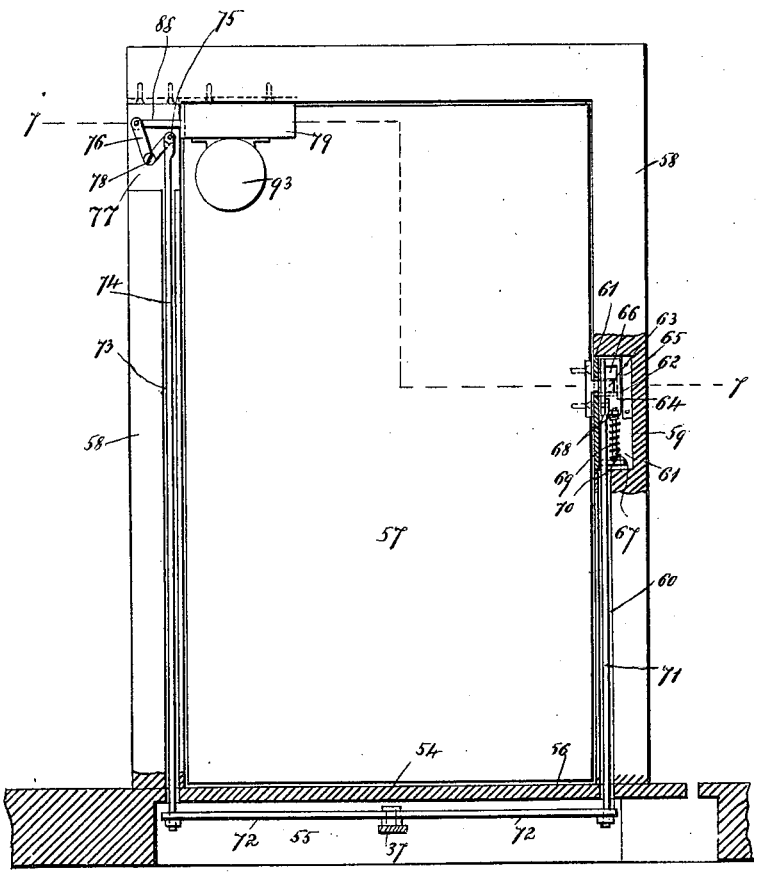
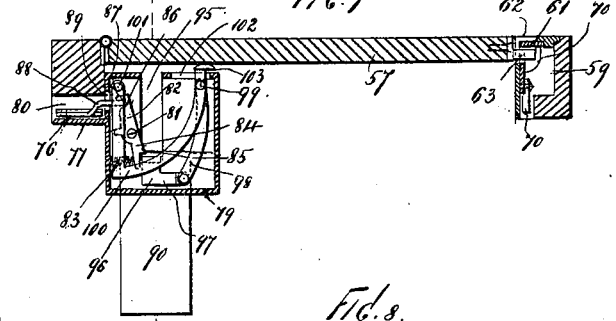
WITNESSES
INVENTOR
Olof Johnson,
BY
Edgar Salerto
ATTORNEYS.
THE NORRIS PETERS CO., PHOTO-LITHO., WASHINGTON, D. C.

UNITED STATES PATENT OFFICE.

OLOF JOHNSON, OF BROOKLYN, NEW YORK.

STABLE APPARATUS.

SPECIFICATION forming part of Letters Patent No. 670,280, dated March 19, 1901.

Application filed December 7, 1899. Serial No. 739,474. (No model.)

*To all whom it may concern:*

Be it known that I, OLOF JOHNSON, a subject of the King of Sweden and Norway, residing at Brooklyn, in the county of Kings and State of New York, have invented certain new and useful Improvements in Stable Apparatus, of which the following is a full and complete specification, such as will enable those skilled in the art to which it appertains to make and use the same.

This invention relates to stable apparatus; and the object thereof is to provide an improved apparatus of this class whereby draft-animals may be hitched to and readily released and set free from their stall connections and whereby a stable-door may be simultaneously released and actuated to allow the escape of the draft-animals from the stable in case of conflagration or other emergency. It is well known that when it is necessary to release each animal separately from the stall or manger by their hitching devices and then to open the door or doors of the stable to allow the exit of the animals all this individual manipulation requires excessive time and, furthermore, results in confusion, as each animal immediately upon its release becomes frightened in case of fire or other emergency. If, however, as is the object of my invention, safe means be provided whereby a single controlling device will both release the draft-animals and also open the doors much time may be saved, and the animals upon gaining their freedom may pass out of the building. Furthermore, the caretaker or other person who operates my improved apparatus may station himself at the open doors to capture and control the animals as they pass out, whereas if the doors be opened before the animals are released the latter pass out one at a time and generally escape capture, or if at present the doors be not opened until the animals are all released the confusion above mentioned occurs.

My invention consists of the construction and arrangement of parts, all as fully disclosed in the following specification, of which the accompanying drawings form a part, with which like reference characters denote like parts in the separate views, and in which—

Figure 2:
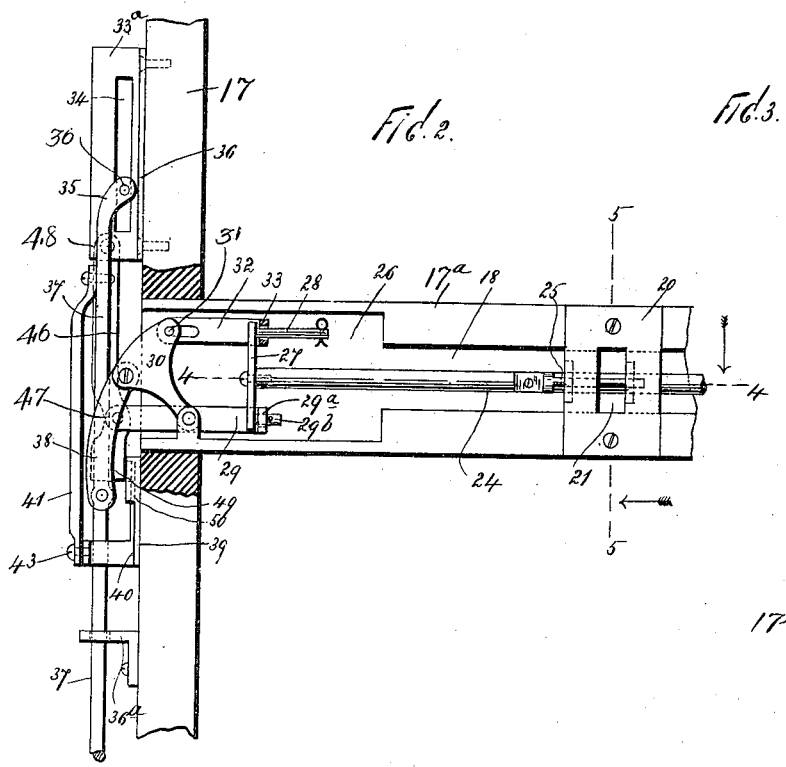
Figure 3:
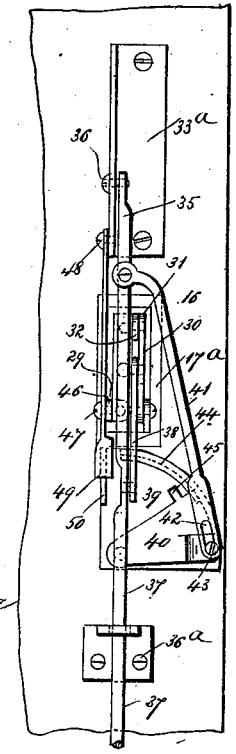
Figure 4:
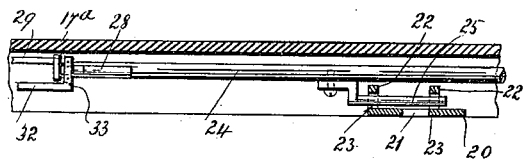
Figure 5:
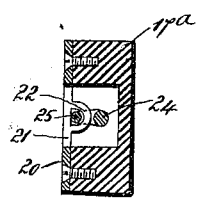

Figure 1 is an inside view of a portion of a stable provided with my improved means for attaching and releasing horses and other draft-animals, also showing in dotted lines at one side my improved means for unlocking the stable-door. Fig. 2 is an enlarged front view of several details thereof; Fig. 3, a side view thereof; Fig. 4, a partial section of Fig. 2 on the line 4 4; Fig. 5, a section of Fig. 2 on the line 5 5; Fig. 6, an elevation of my improved door, which forms part of my invention, showing the means for locking and actuating the same. Fig. 7 is a section thereof on the line 7 7; Fig. 8, a section of Fig. 7 on the line 8 8.

In all of the figures which are sectional the sections are taken looking in a direction indicated by the arrows placed adjacent the various section-lines.

Referring more particularly to the drawings, I have shown at 15 the end walls of a stable and at 16 the side wall thereof. Connected with the side wall 16 is an upright 17, and supported at either end by said upright 17 and one of the end walls 15 is a bar $17^a$, provided with a longitudinal chamber 18 at one side thereof. The bar $17^a$ is preferably located in front of the stall-manger 19. A plurality of plates 20 are secured to the bar $17^a$, spanning the chamber 18, and each of the plates 20 is provided with a vertical slot 21. Each of the plates 20 is, as shown in Figs. 4 and 5, provided with a pair of inwardly-directed bosses 22, which are provided with eyes 23, and slidably mounted beneath the plates 20 and bosses 22 is a rod 24, which operates within the chamber 18 and is provided with a plurality of hooked fingers 25, each of which operates within one pair of eyes 23. The chamber 18 in the bar $17^a$ is enlarged at the end adjacent the upright 17, as shown at 26, and within said chamber the rod 24 is provided with a cross-head 27, provided with a stud 28, which extends above and parallel with the rod 24, and the cross-head 27 is also provided with an outwardly-projected bar 29, which is loosely connected therewith by means of a slotted head $29^a$, connected with the cross-head 27 by a bolt $29^b$, as shown in Figs. 1 and 2.

The upright 17 is chambered to receive the end of the bar $17^a$, and mounted pivotally within the chamber 26, adjacent the outer end thereof, is an angular piece 30, pivotally connected at one corner, as at 31, with a link 32, provided with an angular perforated head 33, which operates longitudinally of the stud 28. Mounted upon the outer side of the upright 17 and above the end of the bar 17ª is a frame 33ª, provided with a vertical slot 34, in which travels a reciprocating rod 35, retained in place by a head 36, which operates within said slot 34. Mounted upon the same side of the upright 17 as the frame 33ª is a slotted bracket 36ª, and an operating-rod 37, rigidly connected with the reciprocating rod 35, operates slidably through said bracket 36ª. The operating-rod 37 is operated manually or in any desired manner. Pivotally connected at one end with the operating-rod 37 and at the other end with the angular piece 30, at one corner thereof, is a link 38, and when the operating-rod 37 is reciprocated the link 38 and angular piece 30 will operate the link 32 longitudinally of the bar 17ª, moving said bar to the right, as shown in Fig. 1, and if the rod 37 be further reciprocated the link 32 will slide longitudinally of the stud 28. A guide-plate 39 is secured to the same face of the upright 17 as is secured the bracket 36ª and above said bracket and beneath the end of the bar 17ª. Pivotally connected with the upright 17 at one side of the guide-plate 39 is a catch-piece 40, and a catch-rod 41, pivotally connected with the operating-rod 37, is adjustably connected with the catch-piece 40 by means of a slot 42, within which operates a pin 43. Said catch-piece 40 operates beneath a segmental curved flange 44, formed upon the edge of the guide-plate 39, and formed upon one side of the catch-piece 40 is a catch-head 45. A locking-arm 46 is pivotally connected adjacent its lower end with the bar 29, as at 47, and at its upper end, as at 48, with the frame 33ª. The lower end of the locking-arm 46 is provided with a double-curved locking-head 49, which operates in connection with a shoulder 50, formed upon one edge of the guide-plate 39. The locking-head 49 when in position in engagement with the shoulder 50 is in position to be engaged by the catch-head 45 of the catch-piece 40 when the latter is swung upwardly, all of which is clearly shown in Fig. 3, and when the locking-head 49 is thus engaged by the catch-head 45 the locking-rod 46 is prevented against pivotal movement. As the bar 29 is directly connected with the locking-arm 46, when said locking-arm is engaged and locked by the catch-head 45 the rod 24 will be prevented from movement longitudinally of the chamber 18 and the bar 17ª. It is evident that upon each downward movement of the operating-rod 37, with the parts in the position shown in Fig. 1, the link 38 will swing the angular piece 30 to move the link 32, the cross-head 27, and rod 24 to the left, withdrawing the fingers 25 from the eyes 23 in the bosses 22, and in the practice of my invention I provide chains or halter members 51, provided with rings 52, which may be passed into the slots 21 in the plates 20 and engaged by the fingers 25 to retain them in such position. The chains 51 are provided with the ordinary or any desired form of fastening device 53, by which they may be connected with the halter, bridle, or other parts of the harness of a draft-animal. It is evident that when the rod 24 is reciprocated to the left, as above described, by means of a downward reciprocation of the operating-rod 37 manually or in any desired manner, the bar 29 will be operated in a similar direction, swinging outwardly the locking-arm 46 and withdrawing the locking-head 49 from the shoulder 50, this being now possible, as the catch-piece 40 is swung downwardly by the catch-rod 41 to withdraw the catch-head 45 from said locking-head 49. As the link 32 is operatively connected with the stud 28 by means of the slotted head 33, when the rod 24 has been moved entirely to the left, as above described, an upward movement of the operating-rod 37 would cause simply a movement of the link 32 longitudinally of said stud 28 and the rod 24 would not be actuated. This arrangement is desirable on account of the connections of the rod 37, hereinafter described. Means employed for retaining the rod 24 and fingers 25 in the inward and operative position, as shown in Fig. 1, consists of the locking-arm 46, which may be swung inwardly to force said rod 24 by means of the bar 29, which is pivotally connected therewith and connected with the cross-head 27.

The operating-rod 37 extends downwardly beneath the floor, which is represented in the drawings at 54, and thence passes into a chamber 55, formed beneath the floor and beneath the sill 56 of the door 57, which may be hung at any portion desired of the stable, of which three of the walls 15 and 16 are shown in Fig. 1. The door 57 is preferably hung in the wall 15, which extends at right angles to the wall 16, and is hinged in the ordinary or any desired manner in the door-frame 58, which latter is chambered at one side at 59 and provided with a vertical chamber 60, communicating therewith beneath the door-sill 56. The operating-rod 71, within the chamber 59, is, as hereinafter described, connected with an angular locking-plate 61, which is provided with an angular bolt-opening 62, into which the bolt 63 of the door 57 may ride. A latch-plate 64 is vertically slidably mounted within the chamber 59 and in engagement with the angular plate 61. The locking-plate 64 is provided with an angular recess 66, adapted to register with the bolt-opening 62, and is normally supported by means of a coiled spring 67, which operates beneath a shoulder or lug 68, formed upon the lower portion of the locking-plate 61, and coiled about a pin 69, mounted upon a bracket 70, connected with the angular plate 61. Mounted in the chamber 60 is an operating-rod 71, which is connected with the locking-plate 61 at its upper end and at its lower end with a horizontal connecting-rod 72, which is centrally connected with the operating-rod 37. The opposite side of the door-frame 58 is provided with a vertical chamber 73, and mounted therein is a reciprocating operating-rod 74, which is pivoted at its upper end, as at 75, to a bell-crank lever 76, pivoted to a flange 77, as at 78, of a casing 79, as clearly shown in Figs. 6 and 7.

The casing 79 is connected with the door-frame 58 by means of the flange 77, and said door-frame is provided with a chamber 80 at its upper end and communicating with the chamber 73, the bell-crank lever 76 being arranged within said chamber 80, as clearly shown in Fig. 7. Within the casing 79 is pivoted, as at 81, a dog 82, which is actuated by a spring 83, which presses against one end 84 and is provided with a shoulder 85. The dog 82 is provided at the end 86 opposite to the end 84 with a shoulder 87, as shown in the dotted lines in Fig. 7, and a catch 88, pivotally connected with the bell-crank lever 76, passes through an opening 89 in the side of the casing 79 and engages with said shoulder 87, all as shown in Fig. 7. Rigidly connected with the under side of the casing 79 is a hollow cylindrical casing 90, which projects outwardly, and mounted therein is a telescoping casing 91. (Clearly shown in Fig. 8.) A coiled spring 92 is arranged within the casing 91, bearing upon the outer closed end 93 of the casing 90 at one end and at the other end against the closed end 94 of the casing 91. The bottom of the casing 79 is provided with a recess 95, which is also cut through one side of the casing 79, and a cross-head 96, connected with the closed end 94 of the casing 91, operates within said recess 95. The upper end of said cross-head 96 operates in connection with the shoulder 85 upon the dog 84, normally retaining the casing 91 in telescoped position within the casing 90 against the tension of the spring 92. The cross-head 96 is provided within the casing 79 with a laterally-directed head 97, and pivotally connected therewith is a curved link 98, which is pivotally connected, as at 99, with the outer end of a bowed lever 100, which is pivoted, as at 101, adjacent the dog 84. The lever 100 and the link 98 operate within a slot 102, formed in the inner side of the casing 79, and the lever 100 is provided at its outer end with a head 103, which normally rests in engagement with the door 57.

It is evident that upon the depression of the operating-rod 37 the connecting-rod 72 will be depressed and the operating-rod 71 be depressed to depress the locking-plate 64 within the chamber 59 against the spring 67, bringing the angular recess 66 in the locking-plate 64 into registration with the bolt-opening 62. The bolt 63 is free to pass out of said bolt-opening, allowing the door to open. Upon depression of the connecting-rod 72 the operating-rod 74 will also be depressed, swinging around the bell-crank lever 76 by means of the link 88, swinging the dog 86 within the casing 79 to disengage the cross-head 96 and the shoulder 85, formed upon said dog, and allow the spring 92 to force the casing 91 out of its telescoped position within the casing 90 and forces the lever 100 and link 98 back to swing through the recess 102 in the casing 79 and forces the head 103 against the door 57 to open the same. It is evident, therefore, that when the operating-rod 37 is depressed to reciprocate the rod 24 within the chamber 18 in the bar 17 and release the chain 51, by which a draft-animal may be readily hitched, the operating-rods 71 and 74 are also operated by means of the connecting-rod 72, connected with the operating-rod 37, and the locking-plate 64, which normally retains the bolt 63 within the bolt-opening 62 in the plate 61, is operated to free said bolt 63, and that the operating-rod 74 is adapted to swing the dog 82 within the casing 79, freeing the head 97 of the cross-head 96 and allowing the spring 92 to force around the lever 100 and link 98, opening the door 57.

The construction shown in Figs. 6 to 8, inclusive, is not claimed specifically in this case, but is made the subject-matter of a divisional application filed May 7, 1900, Serial No. 15,733.

It is evident that my improved apparatus may be considerably varied in the construction and arrangement of its parts, and many applications thereof for different purposes may manifestly be made. I do not therefore desire to limit myself to the specific details described.

Having fully described my invention, I claim as new and desire to secure by Letters Patent—

1. In an apparatus of the class described, means for engaging and holding a portion of the harness or bridle of a draft-animal, an operating member, an angular piece having a sliding engagement with said means, a link by which said operating member and said angular piece are connected, a pivoted locking-arm operatively connected with said means, a catch-rod pivotally connected with said operating member, and a pivoted catch-plate pivoted to said catch-rod and arranged to be engaged with said locking-arm, whereby the movement of said means is prevented, said catch-plate being provided with a lug or shoulder, and said locking-arm with a head which operates in connection therewith, substantially as shown and described.

2. In an apparatus of the class described, means for engaging and holding portions of the harness or bridle of a draft-animal, a slidably-mounted operating-rod, brackets or frames in which the same is slidably mounted, said means being provided at one end with a loosely-mounted link, and with a projecting rod, a pivoted angular piece loosely connected with said link, and pivotally connected with said operating-rod by means of a link, a pivoted locking-arm pivotally connected with said rod with which said means are provided, a catch-arm pivotally connected with said operating-rod, and a pivoted catch-plate with which said catch-arm is also operatively connected, said locking-arm being provided with a head in connection with which said catch-plate operates, and whereby said means are prevented from movement, substantially as shown and described.

3. In an apparatus of the class described, a reciprocating rod, a fixed device and a device mounted upon said rod which operates in connection therewith to secure the halter, said rod being provided at one end with a cross-head and with a projecting stud, a pivoted link loosely connected with said stud, a locking-arm operatively connected with said cross-head, an operating member, locking devices operatively connected with said operating-arm and arranged to engage said locking-arm to maintain the same in operative position, substantially as shown and described.

4. In an apparatus of the class described, a reciprocating rod, a fixed device and a device mounted upon said rod which operates in connection therewith to secure the halter, said rod being provided at one end with a cross-head and with a projecting stud, a pivoted link loosely connected with said stud, a locking-arm operatively connected with said cross-head, an operating member, locking devices operatively connected with said operating-arm and arranged to engage said locking-arm to maintain the same in operative position, and means for operating said reciprocating rod, substantially as shown and described.

5. A stable provided with a door, latching or locking devices in operative connection with the door and the frame thereof, animal-hitching devices suitably supported within said stable, devices for operating said animal-hitching devices, and a vertically-movable and reciprocating rod in positive and operative connection with said last-named devices and with the door latching or locking devices whereby the operation of said rod will release the animals and open the door at the same time, substantially as shown and described.

In testimony that I claim the foregoing as my invention I have signed my name, in presence of the subscribing witnesses, this 7th day of September, 1899.

OLOF JOHNSON.

Witnesses:
F. A. STEWART,
C. C. OLSEN.